United States Patent
Toguchi et al.

(10) Patent No.: US 6,880,025 B2
(45) Date of Patent: Apr. 12, 2005

(54) EFFICIENT TIMEOUT MESSAGE MANAGEMENT IN IEEE 1394 BRIDGED SERIAL BUS NETWORK

(75) Inventors: Kazunobu Toguchi, White Plains, NY (US); Takashi Sato, Scarborough, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/029,826

(22) Filed: Dec. 27, 2001

(65) Prior Publication Data

US 2003/0126332 A1 Jul. 3, 2003

(51) Int. Cl.$^7$ .......................... G06F 13/00; G06F 13/42
(52) U.S. Cl. ....................... 710/104; 710/105; 710/106
(58) Field of Search ...................... 710/8, 10, 104–106, 710/112, 117–118, 125; 713/1–2, 100, 500; 370/254–260, 402; 709/237–238, 240–241, 244

(56) References Cited

U.S. PATENT DOCUMENTS

| | | | | |
|---|---|---|---|---|
| 6,728,809 B1 | * | 4/2004 | Suzuki et al. | 710/118 |
| 6,748,559 B1 | * | 6/2004 | Pfister et al. | 714/56 |
| 2002/0057655 A1 | * | 5/2002 | Staats | 370/256 |
| 2004/0044801 A1 | * | 3/2004 | Haupt et al. | 710/1 |

OTHER PUBLICATIONS

Free On–Line Dictionary of Computing. Entry: 'random–access memory'. [online: Dec. 5, 1995]. [Retrieved Jun. 21, 2004]. <http://foldoc.doc.ic.ac.uk/foldoc/foldoc.cgi?Random+Access+Memory>.*

"P1394.1 Draft Standard for High Performance Serial Bus Bridges." Draft 0.16. Mar.–29, 2001. Institute of Electrical and Electronics Engineers. TK7879.B87D731999.*

* cited by examiner

Primary Examiner—Mark H. Rinehart
Assistant Examiner—Thomas J. Cleary
(74) Attorney, Agent, or Firm—Gregory L. Thorne

(57) ABSTRACT

A method and system for TIMEOUT message management in a serial bus bridged network includes (a) implementing a register table by a portal that contains a plurality of entries for storing respective remote timeout values from a portal's local bus to a particular destination bus in a same net, (b) intercepting a TIMEOUT response message addressed to the portal's local bus, (c) storing the remote timeout values for asynchronous transactions contained in the TIMEOUT response message intercepted in step (b), (d) forwarding the TIMEOUT response message intercepted in step (b) to the originally addressed node; (e) intercepting a TIMEOUT request message by the portal, (f) synthesizing timeout values by one of: retrieving or calculating, (g) sending the timeout values the sender of the TIMEOUT request. There may be intermediate buses connected between the source bus and the destination bus, and the intermediate busses may also intercept and store timeout values to eliminate the need to actually contact the destination each time the timeout values are required. An apparatus includes hardware for intercepting, retrieving and synthesizing a response message.

17 Claims, 4 Drawing Sheets

EFFICIENT TIMEOUT MESSAGE MANAGEMENT IN IEEE 1394 BRIDGED SERIAL BUS NETWORK

BACKGROUND OF THE INVENTION

1. Field of the Invention

The present invention relates to a high performance serial bus. More particularly, the present invention relates to timeout message management in an IEEE 1394 bridge network.

2. Description of the Related Art

The IEEE 1394 is a high performance serial bus that has one of the most versatile interconnect technologies available. The IEEE 1394 high-speed serial bus is capable of transfer speeds of 100 Mb, 200 Mb, or even 400 Mb. These transfer speeds are available over twisted-pair wire, and the serial bus is hot-plugable. The IEEE 1394 can be used in many applications, including but not limited to, video streaming from a camcorder, controls for automobiles, and digital audio signals such as MIDI.

In addition, IEEE 1394 is an international standard for a low-cost digital interface that is used for integrating computing, communication, and entertainment into multimedia applications.

An important feature of IEEE 1394 is that it has flexible topology that supports daisy chaining and branching for communication throughout a particular network.

In an IEEE 1394 network, the serial bus architecture is defined in terms of nodes. A node is an independently resettable and identifiable addressable entity. Each node is a logical entity having a unique address, which includes an identification ROM and control registers. These control registers are a standardized set and can be reset independent of each other.

IEEE 1394 provides asynchronous transport that is a traditional memory-mapped loaded and stored interface. During an asynchronous transport, a data request is sent to a specific address, and the entity having that address returns an acknowledgement.

In an IEEE 1394 network, there can be up to 1,023 logical buses and up to 63 nodes on each bus. If both the asynchronous packet sender and receiver are on the same bus, transaction timeout values can be obtained according to IEEE draft standard 1394-1995. However, if a sender exists on a different bus as a receiver, the sender sends a TIMEOUT request message addressed to the bus where the receiver is connected in order to obtain remote_timeout_seconds, remote_timeout_cycles, max_remote_payload and hop_count values for a remote transaction between the two buses. The remote_timeout_seconds, the remote_timeout_cycles, the max_remote_payload and the hop_count values are referred to collectively as remote timeout values.

According to the draft standard for IEEE 1394.1 high performance serial bus bridges revision 1.00, each bridge on the path from a source bus to a destination bus shall intercept a TIMEOUT request message and update each field as follows: The TIMEOUT request message shall be forwarded by bridges on its route toward the destination bus. The last exit portal on the destination bus that intercepts the TIMEOUT request message also adds its local SPLIT_TIMEOUT value obtained according to IEEE 1394-1995 standard to the remote timeout field in the message and synthesizes a TIMEOUT response message that contains the result of the above calculation and sends it to the message sender.

According to IEEE1394.1 draft standard, when there is a node on a bus which sends a TIMEOUT request message to a destination bus, even if other nodes on the first source bus have already obtained the remote transaction timeout values for a remote transaction to the destination bus, a TIMEOUT request message shall be forwarded and processed by every bridge portal on the path from a source bus to the destination bus each and every time a TIMEOUT request message is initiated to the same destination bus.

Accordingly, the processing by each portal on the path between a source bus and a destination bus of subsequent TIMEOUT request messages from other nodes on the same source bus to the same destination bus is redundant, and wastes bandwidth resources.

As another node on the source bus has already obtained the remote transaction timeout values of the destination bus, a node, which needs the same remote transaction timeout values, should be able to obtain these values from the node on the same bus that has previously received them. The redundancy of the transaction proceeding again to the same bridge portals on the path causes congestion by permitting unnecessary transaction time for another node which sends the TIMEOUT request message has to wait for a corresponding response.

SUMMARY OF THE INVENTION

Accordingly, in a first aspect of the present invention, a method for efficient TIMEOUT message management comprises:

(a) implementing a register table by a portal that contains a plurality of entries for storing respective remote timeout values from a local bus of a portal to a particular destination bus in a same net, wherein an Nth entry of the register table is corresponding to a bus ID of N;

(b) intercepting a TIMEOUT response message en route to a particular-addressed node by an exit portal if the TIMEOUT response message is addressed to the local bus of the portal, the TIMEOUT response message comprising remote timeout values;

(c) storing the remote timeout values contained in the TIMEOUT response message intercepted in step (b) in a corresponding entry of the plurality of entries in the register table implemented in step (a);

(d) forwarding the TIMEOUT response message intercepted in step (b) to the particular-addressed node;

(e) intercepting by a portal of a TIMEOUT request message from an initial requester, if the remote timeout values from the local bus of the portal to the destination bus to which the intercepted TIMEOUT request message is addressed have been stored previously by step (c) in the register table recited in (a);

(f) synthesizing by the portal of a corresponding TIMEOUT response message having the remote timeout values for a remote transaction from the local bus of the portal to the destination bus where the intercepted TIMEOUT request from step (e) is addressed by one of:

(i) retrieving the remote timeout values from the register table if said initial requester of the TIMEOUT request message identified in step (e) is on the local bus of the portal; and (ii) calculating the remote timeout values retrieved from the register table if said initial requester of the TIMEOUT request message identified in step (e) is not on the local bus of the portal, wherein a max_remote_payload value is the smaller of max_remote payload values in one of: (1) the intercepted TIMEOUT response message in step (b), and (2) the corresponding register table entry, and wherein remote timeout seconds, remote timeout cycles and hop count values in the intercepted TIMEOUT request message are added to the corresponding register table entry to the destination bus, respectively; and (g) sending the TIMEOUT response message synthesized in step (f) to said initial requester of the TIMEOUT request message intercepted in step (e).

With regard to step (a), in an embodiment, the register table has 1023 entries, but this number could be different if the present invention is employed in a serial bus other than the 1394, or according to need.

With regard to step (e), the portal will not forward the intercepted TIMEOUT request message to the destination bus, which is a different procedure than according to the conventional IEEE 1394 standard.

With regard to step (f)-(ii) the remote_timeout_seconds, the remote_timeout_cycles and the hop_count values in the intercepted TIMEOUT request message are added to those in the table register entry corresponding to the destination bus ID, respectively. The max_remote_payload value is set to a smaller value between that in the intercepted TIMEOUT request message and that stored in the table register entry corresponding to the destination bus ID.

The register table recited in (a) may comprise a RAM of a portal.

The source and destination buses may be connected in a serial path via one or more bus bridges. The bus may comprise part of a bridged network, which can be a 1394 bridged network.

DETAILED DESCRIPTION OF THE INVENTION

Figure 1:
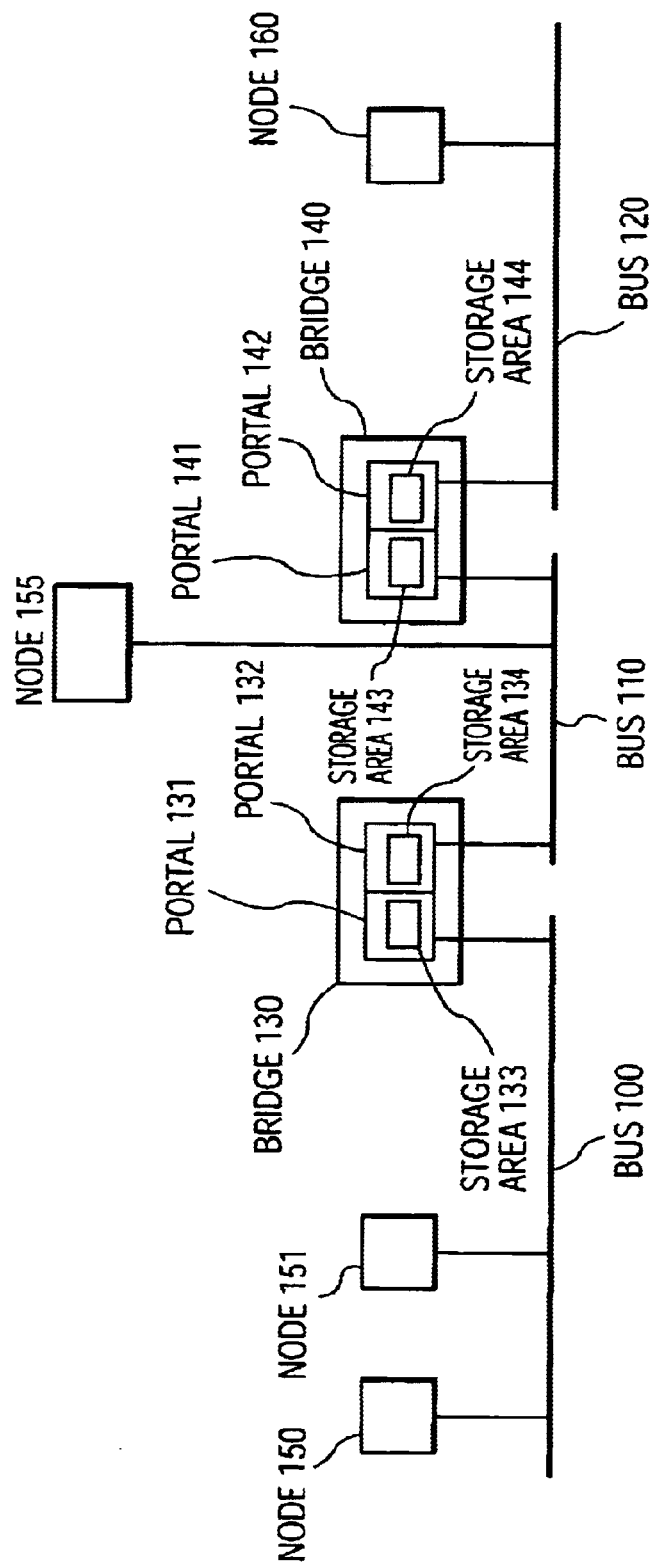
FIG. 1 illustrates an example of a source bus and a destination bus linked serially by a series of bridge portals according to the present invention.

FIG. 1 shows an example of IEEE1394 serial bus net comprising a first or source bus 100, a second bus 110 and a third or destination bus 120; the first bus 100 and second bus 110 are connected by a bridge 130, and the second bus 110 and the third bus 120 are connected by a bridge 140.

Bridge 130 comprises portals 131 and 132, and bridge 140 comprises portals 141 and 142. Further, as shown in FIG. 1, each of the portals 131, 132, 141, and 142 includes corresponding storage areas 133, 134, 143, and 144, respectively. Node 150 exists on the first bus 100 as a TIMEOUT request message sender, and node 160 exists on the third bus 120 as a destination of a TIMEOUT request message-addressed node. A network configuration to which the invention applies should not be restricted only to this example.

Firstly, the node 150 sends a TIMEOUT request message to the node 160 when obtaining the remote timeout values from the source bus 100 to the destination bus 120. This TIMEOUT request message could be addressed to either the portal 142 or the destination bus 120.

The TIMEOUT request message will be processed according to IEEE1394.1 Bridge draft standard and forwarded to the last exit portal 142 on destination bus 120.

Upon reception of the TIMEOUT request message, the last exit portal 142 will calculate the remote timeout values according to the P1394.1 working draft, (the contents of which are herein incorporated by reference as background material) and send a TIMEOUT response message with the calculated remote timeout information to the original TIMEOUT request message sender 150 on destination bus 100.

In addition, bus 110 also has node 155, which is shown for the following explanation. In one aspect of the invention, when node 155 sends a TIMEOUT request message toward bus 120, the TIMEOUT request message will be forwarded to portal 142 while the remote timeout values are calculated according to IEEE 1394 draft standard.

Subsequently, portal 142 sends a TIMEOUT response message with the remote timeout values to the original TIMEOUT message requester 155 on bus 110. Portal 141 intercepts the TIMEOUT response message sent by portal 142 since it is addressed to the portal's local bus and stores the remote timeout values for a remote transaction from bus 110 to bus 120 in the TIMEOUT response message into the register table entry corresponding to the destination bus 120. Therefore, when node 150, 151, or portal 131 on bus 100 sends a TIMEOUT request message toward bus 120, the portal 141 shall intercept the TIMEOUT request message and synthesize its TIMEOUT response message with calculated remote timeout values according to the invention.

The portal 131 on source bus 100 will intercept the TIMEOUT response message, if it is addressed to its local bus 100, and stores the remote timeout values found in the TIMEOUT response message into the entry of its internal register table 133 (shown in detail in FIG. 2) corresponding to the bus ID of the destination bus 120.

The first entry portal forwards the TIMEOUT response message to the original requester on its local bus as explained in the IEEE 1394.1 bridge draft standard, the contents of which are herein incorporated by reference as background material.

The remote timeout values from the source bus 100 to the destination bus 120 that is stored in the register table 133 will be valid until either the source bus ID of the source bus 100, or the destination bus ID of the destination bus 120 becomes invalid or is cleaned in terms of bus routing state noted in the P1394.1 working draft.

Thus, the above procedure can be used for intercepting a TIMEOUT response message and storing the timeout response message found in the message into the register table. Next, the procedure for intercepting a TIMEOUT request message and providing a synthesized TIMEOUT response message is explained, infra.

Subsequently, when portal 131 on bus 100 receives a TIMEOUT request message initiated by another node 151 (or possibly node 150) on the same source bus 100, the first entry portal 131 synthesizes a TIMEOUT response message containing the remote timeout values which can be retrieved from the entry of its internal register table 133 corresponding to the destination bus 120, because the valid remote timeout values from the source bus 100 to the destination bus 120 have been stored into the register table by the entry portal 131 as explained above.

Subsequently, the first entry portal 131 on bus 100 sends this synthesized TIMEOUT response message to the TIMEOUT request message requester 151, instead of forwarding the TIMEOUT request message to the destination bus 120.

Thus, the first entry portal 131 on the source bus 100 can synthesize a TIMEOUT response message, if the register table of the entry portal 131 has stored the desired remote timeout values for a remote transaction from its local bus 100 to the destination bus 120 in the internal register table 133.

Figure 2:
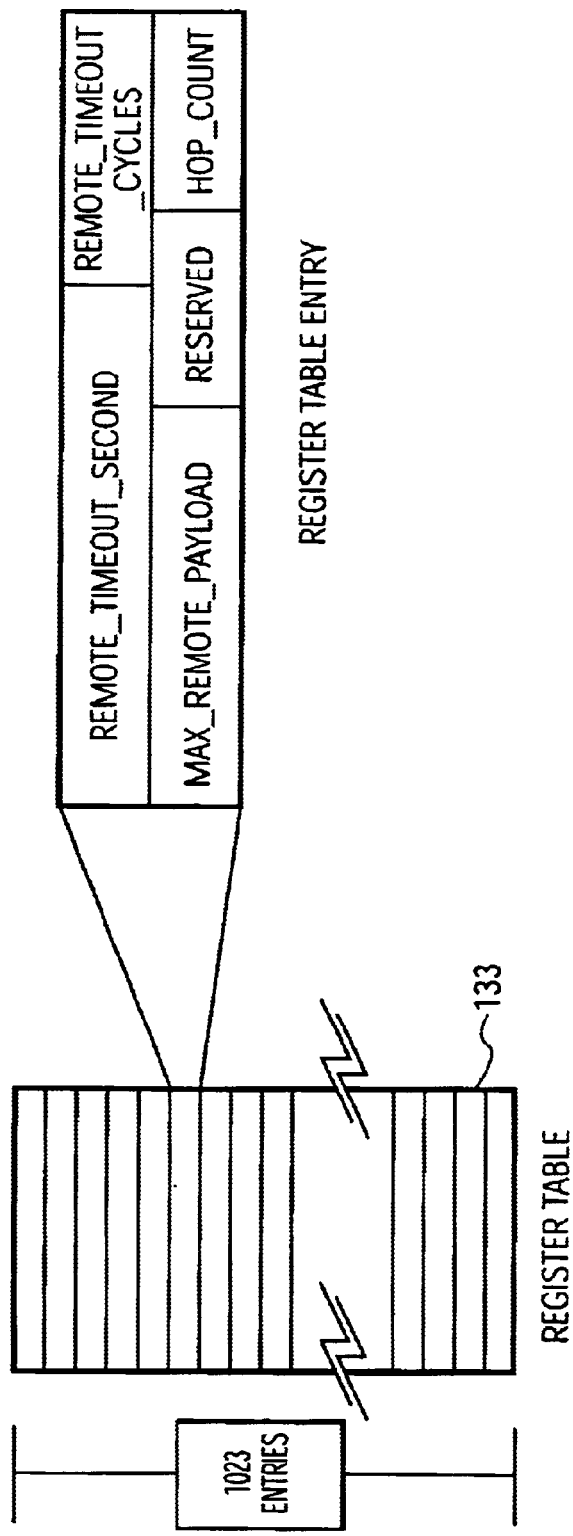
FIG. 2 is a detailed schematic of the structure of the register table recited in (a) and implemented in storage areas 133 and 143.

FIG. 2 shows the detail of structure of a register table for storing timeout values for from its portal's local bus to each particular bus. While the register table may consist of 1023 entries for 1023 possible buses, the number of the table entries is not restricted to 1023, and could differ.

Each table entry consists of at least four fields; the remote_timeout_seconds, the remote timeout cycles, the max_remote_payload and the hop_count as same as those in TIMEOUT message defined in IEEE1394.1 bridge draft standard. And each timeout value for from its portal's local bus to a particular destination bus is stored into the same field of the corresponding table entry to the particular destination bus. This register table 133 could consist of RAM or any other type of storage known in the art.

In other words, according to the presently claimed invention, if a portal is a last exit portal which forwards a TIMEOUT response message, addressed to the portal's local bus, that contains a remote timeout values for a transaction between its local bus and a particular remote destination bus, the TIMEOUT response message is processed according to the IEEE 1394.1 bridge draft standard except that for the interception of the TIMEOUT response message and the storing of the remote timeout values in the TIMEOUT response message into the entry of the internal register table entry corresponding to the particular remote destination bus by previously disclosed steps (b) and (c).

In addition, subsequent to the storage of the remote timeout values between the source bus 100 and the destination bus 120, the present method is thereafter utilized when other nodes on the same bus as the portal is connected to such as the node 151 and/or possibly the same node 150, including bridge portal 131 on the same bus 100 that need a remote time values from the local bus 100 to the same remote bus 120, by synthesizing a TIMEOUT response message containing the remote timeout values retrieved from the timeout values previously stored in the register table 133 of the first entry portal 131. This synthesis of the TIMEOUT response message and direct reply to the TIMEOUT request message sender significantly reduce congestion between the bus 100 and bus 120, and speeds the obtainment of the remote timeout values because the second requesting node 151 receives the remote timeout values from the local bus to the destination bus 120 much faster directly from the first entry portal 131 than it would by the conventional method according to IEEE1394.1 bridge draft standard.

The illustration of a network configuration shown in FIG. 1 is for purposes of illustration and not for limitation, and a person of ordinary skill in the art understands that the network configuration is not restricted to the illustration, as any number of buses could be connected serially. When applying the present invention to the 1394 configuration, it is understood that the network configuration can be varied so long as it is permissible according to IEEE1394 standard. For example, a source bus and/or a destination bus may be connected to more bridge portals and/or there may be more intermediate buses between the source bus and the destination bus.

The presently claimed invention also can be applied to a case that the portal 141 on intermediate bus 110 has already stored the remote timeout values from the intermediate bus 110 to a particular destination bus 120 into the internal register table entry 143 corresponding to the destination bus 120 by step (b) and (c). The synthesized message may contain the smaller max_remote payload value of the intercepted message and the corresponding register table entry.

For example, the node 155 on the bus 110 as a source bus for this transaction could send a TIMEOUT request message to the destination bus 120. According to the presently claimed invention, the portal 141 on the source bus 110 intercepted the corresponding TIMEOUT response message sent by the portal 142 on the destination bus and stored the remote timeout values from the source bus 110 to the destination bus 120 into the internal register table entry 143 corresponding to the bus ID of the destination bus 120.

Figure 4:
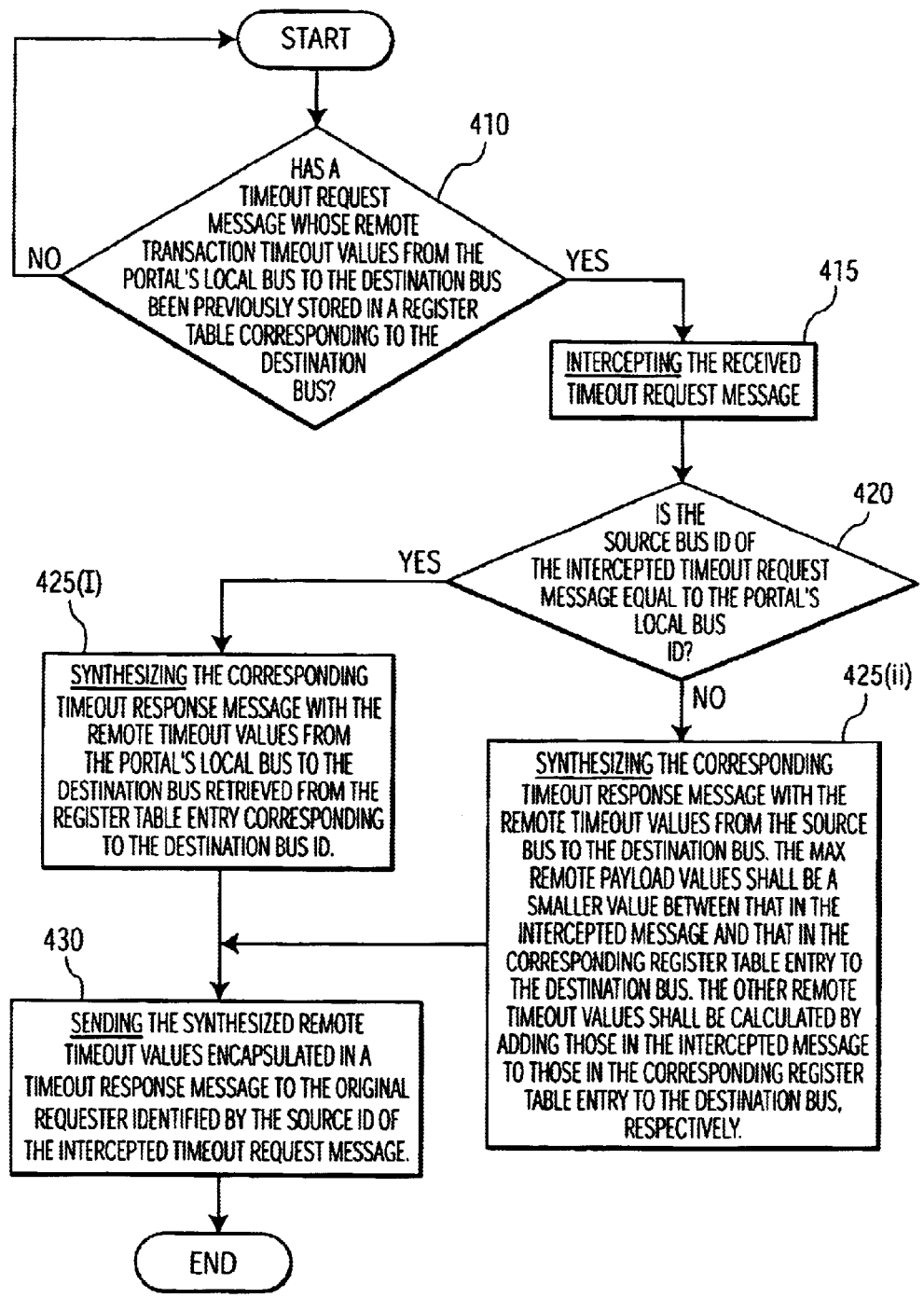
FIG. 4 is a flowchart illustrating the procedure of intercepting the TIMEOUT request message, synthesizing and sending a TIMEOUT response message according to the present invention.

As described in step 425(*ii*) of FIG. 4, when the portal 141 on the bus 110 receives a TIMEOUT request message issued by a node on the source bus 100 for the remote transaction timeout values from the source bus 100 to the destination bus 120, the portal 141 on the intermediate bus 110 will intercept the TIMEOUT request message and synthesize the response.

This process significantly shortens the turnaround time for a TIMEOUT request by a node on the source bus 100, because the portal 141 on the intermediate bus retrieves the stored timeout values and calculates the total timeout values substantially faster than if a TIMEOUT request and TIMEOUT response were exchanged between nodes of the source bus 100 and destination bus 120.

This method also frees up the serial bus resources for servicing other nodes and for reducing overall transaction time of the network.

Figure 3:
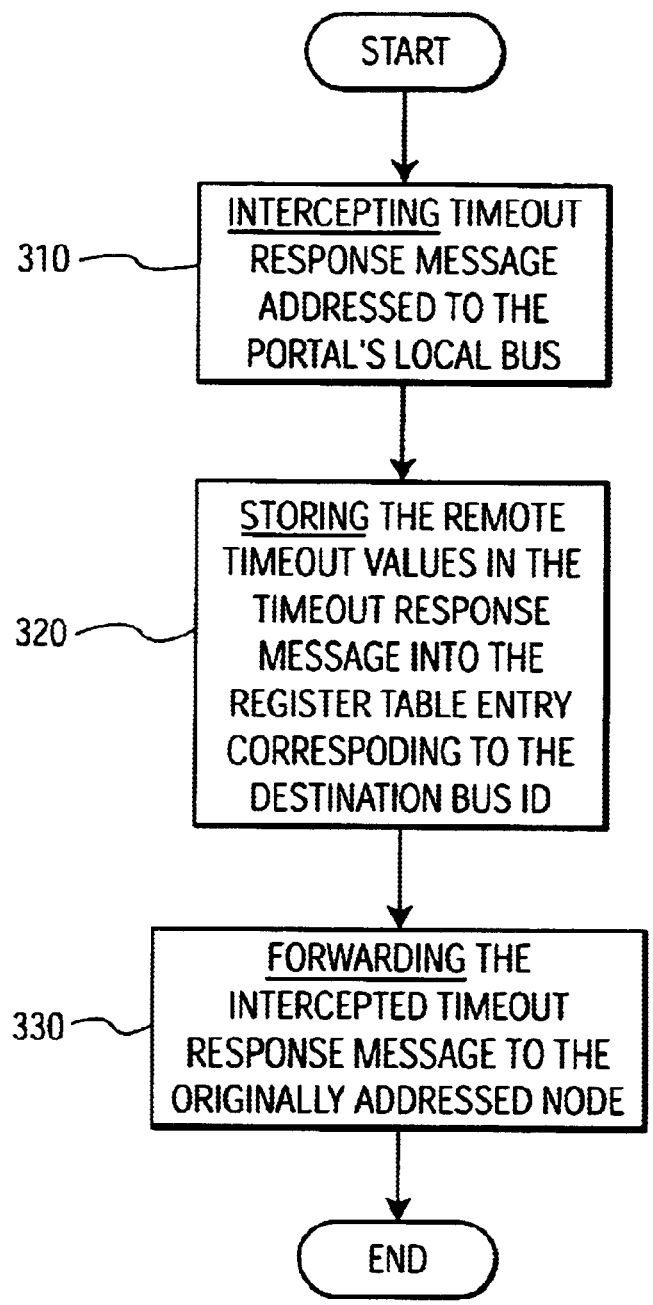
FIG. 3 is a flowchart providing the procedure of intercepting the TIMEOUT response message and storing remote transaction timeout values according to the present invention.

FIG. 3 provides an overview of the steps of the method according to the present invention in terms of intercepting TIMEOUT response message and storing its remote timeout values into internal register table.

At step 310, a TIMEOUT response message addressed to the portal's local bus is intercepted.

At step 320, the remote timeout values in the TIMEOUT response message intercepted in step 310 is stored in the register table corresponding to the destination bus ID.

At step 330, the intercepted TIMEOUT response message is forwarded to the originally addressed node.

Accordingly, steps 310–330 permit the storage of the remote timeout values for retrieval in subsequent requests, in order to enhance the efficiency of the protocol of the serial bus.

FIG. 4 provides an explanation of the procedure for intercepting a TIMEOUT request and synthesizing a corresponding TIMEOUT response message with remote timeout values.

At step 410, if a TIMEOUT request message whose remote transaction timeout values from the portal's local bus to the destination bus which the TIMEOUT request message is addressed to have been stored previously in its register table is received, step 415 will be processed next, otherwise step 410 will be the next step to process.

At step 415, the received TIMEOUT request message is intercepted by the portal. Step 420 will be executed next.

At step 420, it is determined whether the source bus id of the intercepted TIMEOUT request message is equal to the portal's local bus id. If step 420 is answered affirmatively, step 425(*i*) is next performed. Otherwise, if step 420 is answered negatively, step 425(ii) is next performed. These two steps cover either scenario where the requester could be a node from the local bus, or from a remote source bus.

At step 425(i) the corresponding TIMEOUT response with the remote timeout values for the portal's local bus to the destination bus retrieved from the register table entry corresponding to the destination bus.

Alternatively, when step 425(ii) is performed, the corresponding TIMEOUT response message is synthesized, where its timeout values are calculated by the following procedure: The remote_timeout_seconds, the remote_timeout_cycles and the hop_count values in the intercepted TIMEOUT request message are added to those in the table register entry corresponding to the destination bus ID, respectively. The max_remote_payload value is set to a smaller value between that in the intercepted TIMEOUT request message and that stored in the table register entry corresponding to the destination bus ID.

At step 430 the synthesized TIMEOUT response message is sent to the original requester identified by the source ID of the intercepted TIMEOUT request message.

The previous explanations and drawings have been presented for purposes of illustration and not limitation, and a person of ordinary skill in the art understands there are many minor changes that can be made which are within the spirit of the invention and the scope of the appended claims.

What is claimed is:

1. A method for reducing a transaction time required to obtain a timeout values for remote transactions between nodes of a source bus and a destination bus, said method comprising:

(a) implementing a register table by a portal that contains a plurality of entries for storing respective remote timeout values from a local bus of a portal to a particular destination bus in a same net, wherein an Nth entry of the register table is corresponding to a bus ID of N;

(b) intercepting a TIMEOUT response message en route to a particular addressed node by an exit portal if the TIMEOUT response message is addressed to the local bus of the portal, the TIMEOUT response message comprising remote timeout values;

(c) storing the remote timeout values contained in the TIMEOUT response message intercepted in step (b) in a corresponding entry of the plurality of entries in the register table implemented in step (a);

(d) forwarding the TIMEOUT response message intercepted in step (b) to the particular addressed node;

(e) intercepting by a portal of a TIMEOUT request message from an initial requester, if the remote timeout values from the local bus of the portal to the destination bus to which, the intercepted TIMEOUT request message is addressed have been stored previously by step (c) in the register table recited in (a);

(f) synthesizing by the portal of a corresponding TIMEOUT response message having the remote timeout values for a remote transaction from the local bus of the portal to the destination bus where the intercepted TIMEOUT request from step (e) is addressed by one of:

(i) retrieving the remote timeout values from the register table if said initial requester of the TIMEOUT request message identified in step (e) is on the local bus of the portal; and (ii) calculating the remote timeout values retrieved from the register table if said initial requester of the TIMEOUT request message identified in step (e) is not on the local bus of the portal, wherein a max_remote_payload value is the smaller of max_remote payload values in one of: (1) the intercepted TIMEOUT response message in step (b), and (2) the corresponding register table entry, and wherein remote timeout seconds, remote timeout cycles and hop count values in the intercepted TIMEOUT request message are added to the corresponding register table entry to the destination bus, respectively; and (g) sending the TIMEOUT response message synthesized in step (f) to said initial requester of the TIMEOUT request message intercepted in step (e).

2. The method according to claim 1, wherein the storage area for the register table recited in step (a) comprises RAM.

3. The method according to claim 1, wherein the source bus and destination bus comprise a serial bus connected by a bus bridge.

4. The method according to claim 3, wherein at least one intermediate bus is connected in a serial path between said source bus and said destination bus.

5. The method according to claim 1, wherein the source bus and destination bus recited in step (a) are connected via a bridged network.

6. The method according to claim 5, wherein said bridged network comprises a IEEE 1394 bridged network.

7. A method for reducing the transaction time to obtain a total timeout values for remote transactions between nodes of a source bus and a destination bus, said method comprising the steps of:

(a) providing a source bus and a destination bus in a serial path having an intermediate bus connected between the source bus and destination bus via bridges;

(b) intercepting by a portal of said intermediate bus a TIMEOUT response message sent from an exit portal of the destination bus to a particular TIMEOUT requesting node on the source bus;

(c) storing first remote timeout values from the TIMEOUT response message intercepted in step (b) in a storage area of said portal of said intermediate bus and forwarding the TIMEOUT response message intercepted in step (b) to said particular TIMEOUT requesting node on the source bus;

(d) intercepting by said portal of said intermediate bus a subsequent TIMEOUT request message from a subsequent requesting node of said plurality of nodes of said source bus to a node of said plurality of nodes of said destination bus;

(e) said portal of the intermediate bus calculating a remote timeout values from the source bus to the destination bus by adding the first timeout values stored in step (c) to second remote timeout values between the source bus and the intermediate bus except for a max_remote payload value;

(f) synthesizing a TIMEOUT response message by said portal of said intermediate bust said synthesized TIMEOUT RESPONSE including the total timeout values calculated in step (e); and (g) forwarding said synthesized TIMEOUT response message to said subsequent requesting node of said source bus in step (d) that initiated the TIMEOUT request message.

8. The method according to claim 7, wherein the max_remote payload value is a smallest of max-remote payload values in the values intercepted in the message and a corresponding register table entry to the destination bus.

9. The method according to claim 8, wherein the source bus, intermediate bus, and destination bus are connected by a bridged network.

10. The method according to claim 7, wherein the storage area recited in step (c) is a RAM of a portal on said intermediate bus.

11. The method according to claim 7, further includes storing the timeout values of the TIMEOUT response message in a storage area of the source bus.

12. The method according to claim 11, wherein said storage area is a RAM of an entry portal.

13. The method according to claim 12, wherein said source bus, said intermediate bus, and said destination bus comprise a 1394 IEEE bridged network.

14. The method according to claim 7, wherein said source bus and said destination bus comprise a 1394 IEEE bridged network.

15. The method according to claim 14, wherein the network includes a plurality of buses serial connected between the source bus and the destination bus.

16. A serial bus bridged network having a reduced response timeout management system, comprising a source bus having a first portal with a register table;

at least one intermediate bus having a bridge comprising a second portal including a register table;

a destination bus having an exit portal;

a plurality of bus bridges which serially connects said source bus, said at least one intermediate bus and said destination bus;

said first portal of the source bus including means for receiving a TIMEOUT request from a node attached thereto;

said exit portal of said destination bus including means for receiving a TIMEOUT request message and for sending a TIMEOUT response message having timeout values included therein;

intercepting and storing means for intercepting by the bridge portal of said intermediate bus the TIMEOUT response message sent by the exit portal of the destination bus, and for storing timeout values of the TIMEOUT response message from the exit portal of said destination bus in the register table of the bridge portal of the intermediate bus;

means for intercepting and synthesizing, in which said second portal of said intermediate bus intercepts a TIMEOUT request from a node on said source bus, and when an ID of the destination bus in the TIMEOUT request matches an ID of said destination bus having its timeout values stored in the register table of the second portal of the intermediate bus, the second portal synthesizing a TIMEOUT response message comprising a total timeout values by adding the timeout values between said destination bus and said intermediate bus and the timeout values between said source bus and said intermediate bus, except for max_remote payload values, which is a smaller of the intercepted TIMEOUT request message and corresponding table entry, means for transmitting the synthesized TIMEOUT response message having the total timeout values sent to the requesting node on said source bus.

17. The apparatus according to claim 16, wherein said means for storage comprises RAM.

* * * * *